Jan. 3, 1928.
A. J. REEDY
1,654,665
COMBINATION COOKING AND HEATING STOVE
Original Filed Aug. 5, 1925
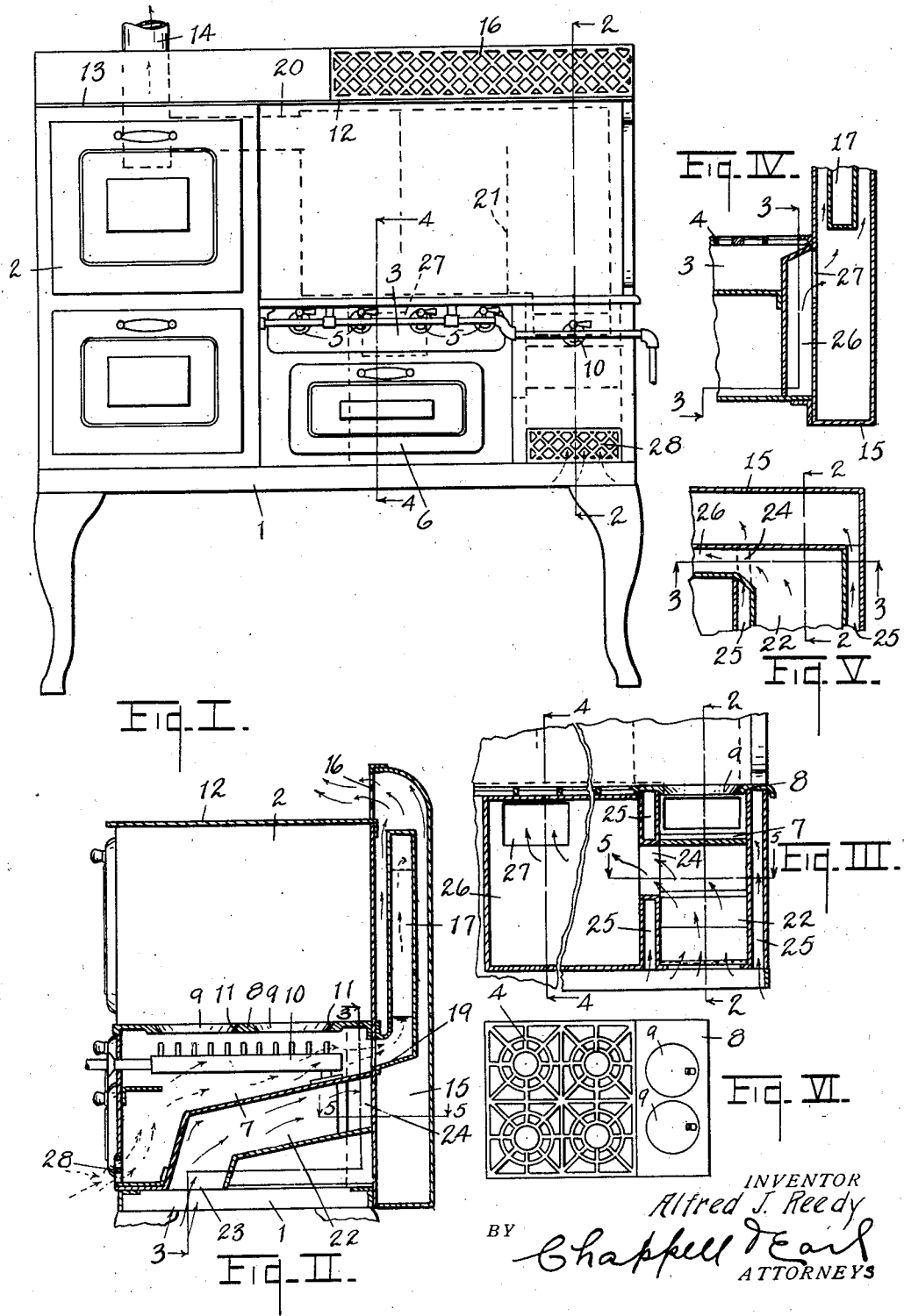
INVENTOR
Alfred J. Reedy
BY Chappell & Earl
ATTORNEYS Patented Jan. 3, 1928.

1,654,665

UNITED STATES PATENT OFFICE.

ALFRED J. REEDY, OF BATTLE CREEK, MICHIGAN, ASSIGNOR TO A-B STOVE COMPANY, OF BATTLE CREEK, MICHIGAN.

COMBINATION COOKING AND HEATING STOVE.

Application filed August 5, 1925, Serial No. 48,263. Renewed December 5, 1925.

This invention relates to improvements in combination cooking and heating stoves.

The main object of this invention is to provide an improved combination cooking and heating gas stove which is well adapted for either purpose and at the same time is compact and attractive in appearance.

Objects pertaining to details and economies of construction of my invention will definitely appear from the detailed description to follow.

I accomplish the objects of my invention by the devices and means described in the following specification. The invention is clearly defined and pointed out in the claims.

A structure embodying the features of my invention is clearly illustrated in the accompanying drawing forming a part of this application, in which:

Fig. I is a front elevation of my improved combination heating and cooking stove.

Fig. II is a vertical section on a line corresponding to line 2—2 of Figs. I and III.

Fig. III is a fragmentary vertical section longitudinally of the stove on a line corresponding to line 3—3 of Figs. II and IV.

Fig. IV is a fragmentary vertical section from front to rear on a line corresponding to line 4—4 of Figs. I and III.

Fig. V is a fragmentary horizontal section on a line corresponding to line 5—5 of Fig. II.

Fig. VI is a top view of the open and closed burner tops.

In the drawings similar numerals of reference indicate similar parts in all of the views.

Referring to the drawings, 1 represents the base frame provided with suitable legs. At one end of this frame is an oven burner unit designated generally by the numeral 2, the details of which are not shown as they form no part of this invention. At the side of this unit is an open top or open burner unit comprising an open burner chamber 3 having a grid-like top 4, the burners 5 being arranged within this open burner chamber. Below this burner chamber 3 is a warming oven provided with a door 6.

At the side of the open burner unit is a closed burner unit comprising the burner chamber 7 having the closed top 8 provided with lids 9, the tops 4 and 8 being in the same plane. The burner 10 of the closed burner unit is in the structure illustrated common to both lid openings 11. A shelf 12 extends from the top of the oven unit over the open and closed burner units, being in effect an extension of the top 13 of the oven unit.

The discharge flue 14 is arranged at the rear of the oven unit. A flat air heating drum 15 is arranged at the rear of the open and closed burner units and extends above the shelf, being provided with a forwardly facing discharge grid 16.

A flat chamber-like flue 17 is arranged within the heating drum and is connected to the burner chamber 7 by the elbow 19 and to the flue 14 by the pipe 20. Vertically disposed alternately arranged baffles 21 are provided for this flue chamber so that as the products of combustion pass from the burner 10 through the flue chamber they are caused to take a zig-zag course, thus providing opportunity for the absorption of the heating units.

An air flue or passage 22 is disposed below the burner chamber 7, the bottom wall of the burner chamber constituting the top wall of this flue, this flue opening to a flue 26 extending along the rear of the open burner unit and through the port 27 into the drum chamber 15. The purpose of this is to provide a more uniform distribution of the heated air within the drum chamber and consequently more uniform discharge from the grid 6.

Air passages 25 disposed at the sides of the closed burner chamber open at the rear to the heating drum. The closed burner chamber has an air inlet grid 28 in the front wall thereof. This is placed well below the burner so that the secondary air flows upwardly around all parts of the burner.

My improved combination cooking and heating stove is highly efficient. The closed burner may be used when desired for heating purposes and the heating units are effectively taken up during the passage of the products of combustion through the flue chamber. The structure also has the advantage of being compact and attractive in appearance.

I have illustrated and described an embodiment which I have found very practical and which it is believed, will enable those skilled in the art to embody and adapt my improvements as may be desired.

Having thus described my invention what

I claim as new and desire to secure by Letters Patent is:

1. A gas stove comprising an oven unit disposed at one end, an open burner unit at the side of said oven unit and a closed burner unit at the side of said open burner unit, said closed burner unit being provided with a burner chamber, tops for said open and closed burner units disposed in the same plane, the top for said closed burner unit being provided with lids, a shelf extending from said oven unit over said open and closed burner units, said shelf constituting an extension for the top of said oven unit, a discharge flue at the rear of said oven unit, a flat heating drum disposed at the rear of said open and closed burner units and provided with a discharge grid above said shelf, a flue chamber disposed in said heating drum and having an inlet connection to said closed burner chamber and a discharge connection to said discharge flue, said flue chamber being provided with vertically disposed baffles, and air passages at the sides and bottom of said burner chamber discharging to said heating drum, there being a discharge connection for said passage at the bottom of said burner chamber disposed at the rear of said open burner unit.

2. A gas stove comprising an oven unit disposed at one end, an open burner unit at the side of said oven unit and a closed burner unit at the side of said open burner unit, said closed burner unit being provided with a burner chamber, tops for said open and closed burner units disposed in the same plane, the top for said closed burner unit being provided with lids, a shelf extending from said oven unit over said open and closed burner units, said shelf constituting an extension for the top of said oven unit, a discharge flue at the rear of said oven unit, a flat heating drum disposed at the rear of said open and closed burner units and provided with a discharge above said shelf, a flue chamber disposed in said heating drum and having an inlet connection to said closed burner chamber and a discharge connection to said discharge flue, said flue chamber being provided with vertically disposed baffles, and air passages at the sides and bottom of said burner chamber discharging to said heating drum.

3. A gas stove comprising an oven unit disposed at one end, an open burner unit at the side of said oven unit and a closed burner unit at the side of said open burner unit, said closed burner unit being provided with a burner chamber, a discharge flue at the rear of said oven unit, a heating drum disposed at the rear of said open and closed burner units and provided with a discharge at the top, a flue chamber disposed in said heating drum and having an inlet connection to said closed burner chamber and a discharge connection to said discharge flue, said flue chamber being provided with vertically disposed baffles, and air passages at the sides and bottom of said burner chamber discharging to said heating drum.

4. A gas stove comprising an oven unit disposed at one end, open and closed burner units disposed side by side at the side of said oven unit, said closed burner unit being provided with a burner chamber having a top provided with lids, a shelf extending from said oven unit to said open and closed burner units, said shelf constituting an extension for the top of said oven unit, an air drum disposed at the rear of said open and closed burner units and provided with a discharge above said shelf, a discharge flue for said closed burner chamber disposed through said air drum, an air passage associated with said burner chamber and a delivery conduit therefor disposed at the rear of the open burner unit and opening to said air drum.

5. A gas stove comprising an oven unit disposed at one end, open and closed burner units disposed side by side at the side of said oven unit, said closed burner unit being provided with a burner chamber having a top provided with lids, an air heating drum disposed at the rear of said burner units and provided with a discharge at the top, a discharge flue for said closed burner chamber disposed through said air heating drum, and air passages at the sides and bottom of said burner chamber having discharge connections to said heating drum, there being a connecting conduit for one of said passages at the rear of said open burner unit.

6. A gas stove comprising an oven unit disposed at one end, open and closed burner units disposed side by side at the side of said oven unit, said closed burner unit being provided with a burner chamber having a top provided with lids, an air heating drum disposed at the rear of said burner units and provided with a discharge at the top, a discharge flue for said closed burner chamber disposed through said air heating drum, and air passages at the sides and bottom of said burner chamber having discharge connections to said heating drum.

7. A gas stove comprising an oven unit disposed at one end and an open burner unit at the side of said oven unit and a closed burner unit at the side of said open burner unit, said closed burner unit being provided with a burner chamber, an air drum disposed at the rear of said burner units and provided with a discharge at the top, a discharge flue for said closed burner chamber disposed through said air drum, an air heating passage operatively associated with said closed burner chamber, and a delivery conduit for such air heating passage to said air drum disposed at the rear of said open burner unit.

8. A gas stove comprising an open burner unit and a closed burner unit provided with a burner chamber, an air drum disposed at the rear of said units and having a discharge at the top, a discharge flue for said closed burner chamber disposed within said air drum, and air heating passages at the sides and bottom of said burner chamber having discharge connection to said heating drum.

9. A gas stove comprising open and closed burner units disposed side by side, said closed burner unit being provided with a closed burner chamber, an air drum disposed at the rear of said units and open for the circulation of air therethrough, a discharge flue for said closed burner chamber disposed in said air drum, and air heating passages at the sides and bottom of said burner chamber.

10. A gas stove comprising a burner chamber, an air heating drum at the rear thereof, said burner chamber having a discharge flue disposed through said air heating drum, and air passages at the sides and bottom of said burner chamber opening to said drum.

11. A gas stove comprising a burner chamber provided with a burner, and air heating passages at the sides and bottom of said burner chamber, said passages being open for the circulation of air therethrough, for the purpose specified.

In witness whereof I have hereunto set my hand.

ALFRED J. REEDY.